United States Patent [19]

Thompson et al.

[11] Patent Number: 5,001,666

[45] Date of Patent: Mar. 19, 1991

[54] MULTIPLE INTERRUPT TRI-LEVEL MICROPROCESSOR OPERATING SYSTEM

[75] Inventors: Michael J. Thompson, Fort Worth; Donald I. Sloan, Hurst; Eric S. Goldsmith, Watauga; John N. Schemelynce, Arlington; Jeffrey W. Klingberg, Fort Worth, all of Tex.

[73] Assignee: Motorola, Inc., Schaumburg, Ill.

[21] Appl. No.: 109,370

[22] Filed: Oct. 19, 1987

[51] Int. Cl.⁵ .............................................. G06F 9/46
[52] U.S. Cl. ................................... 364/900; 364/941; 364/941.1; 364/941.3; 364/941.5; 364/919; 364/919.2; 364/976

[58] Field of Search ... 364/200 MS File, 900 MS File; 340/825.06

[56] References Cited

U.S. PATENT DOCUMENTS

| | | | |
|---|---|---|---|
| 4,229,790 | 10/1980 | Gilliland | 364/200 |
| 4,253,145 | 2/1981 | Goldberg | 364/200 |
| 4,438,489 | 3/1984 | Heinrich | 364/200 |
| 4,475,156 | 10/1984 | Federico | 364/200 |
| 4,488,258 | 12/1984 | Struger | 364/900 |
| 4,513,391 | 4/1985 | Maddock | 364/900 |
| 4,525,861 | 6/1985 | Freeburg | 455/52 |
| 4,532,584 | 7/1985 | Federico | 364/140 |
| 4,589,093 | 5/1986 | Ippolito | 364/900 |
| 4,611,334 | 9/1986 | Engel | 455/52 |
| 4,625,274 | 11/1986 | Shroeder | 364/200 |
| 4,641,238 | 2/1987 | Kneib | 364/200 |
| 4,658,351 | 4/1987 | Teng | 364/200 |
| 4,658,435 | 4/1987 | Childress | 455/54 |
| 4,665,519 | 5/1987 | Kirchner | 370/94 |
| 4,670,906 | 6/1987 | Thro | 455/56 |
| 4,680,787 | 7/1987 | Marry | 455/349 |
| 4,714,923 | 12/1987 | Tassle et al. | 340/825.36 |
| 4,800,521 | 1/1989 | Carter | 364/900 |
| 4,815,030 | 3/1989 | Cross | 364/900 |
| 4,937,777 | 6/1990 | Flood | 364/900 |

*Primary Examiner*—Thomas C. Lee
*Assistant Examiner*—Eric Coleman
*Attorney, Agent, or Firm*—Jon P. Christensen

[57] ABSTRACT

A multiple interrupt tri-level microprocessor operating system (40) having particularly applicability in a two-way radio, includes an operating system that provides a background executive (47) to allow processing of time insensitive tasks, a foreground routine (24) to allow processing of real-time sensitive tasks, and a midground executive (41) to allow processing of time sensitive tasks. The midground executive (41) provides for periodic execution of preselected tasks, which tasks can all be completed within a predetermined period of time.

12 Claims, 3 Drawing Sheets

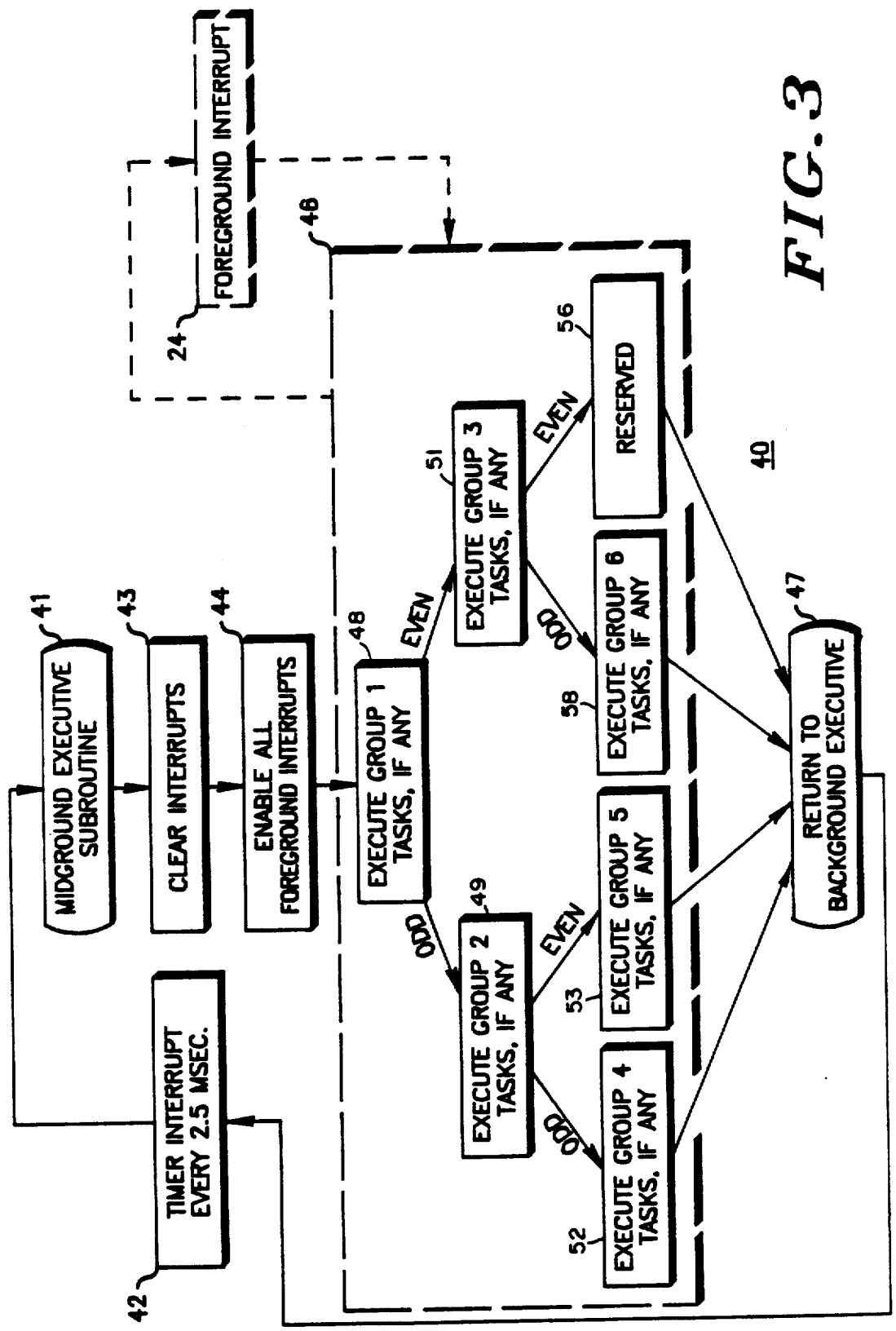

MULTIPLE INTERRUPT TRI-LEVEL MICROPROCESSOR OPERATING SYSTEM

TECHNICAL FIELD

This invention relates generally to computer operating systems, and in particular to operating systems suitable for use in processing real-time sensitive, time sensitive, and time insensitive tasks as necessary in a radio communications product.

BACKGROUND ART

Computers typically execute a series of tasks suitable to the intended application. Some computers are provided with interrupts that allow the normal processing stream to be interrupted and reprioritized to allow immediate processing of a real-time sensitive task. Such interrupt driven systems can be considered to represent a two level structure that provides both background and foreground processing capabilities for time insensitive and real-time sensitive tasks, respectively.

In some applications, time sensitive tasks (as versus real-time sensitive or time insensitive) are present. For example, in a mobile two-way radio having radio functions controlled via a microprocessor, time insensitive tasks such as responding to an operator input, are easily handled by a typical background executive. Similarly, real-time sensitive tasks such as signal encoding and decoding, serial bus data reception, and tone generation can be well accommodated through use of an interrupt driven foreground executive. Time sensitive tasks, however, such as bus command interpretation, channel scanning, audio routing, and synthesizer programming are not well accommodated by prior art two level structures. In the past, such time sensitive tasks have either been added as extensions to one or more of the real-time tasks, or have been accommodated through multiple polling areas in the background executive. Both of these methods have obvious inherent inefficiencies. In the alternative, computer hardware can be designed to allow a middle level of processing activity to accommodate time sensitive tasks. Unfortunately, though the latter solution would work well, it represents significant cost and design time.

A need therefore exists for a method of allowing an ordinary microprocessor having one or more interrupts to accommodate real-time sensitive, time sensitive, and time insensitive tasks in an appropriate way.

SUMMARY OF THE INVENTION

The above needs and others are substantially met through provision of a method for allowing a computer to manage processing of real-time sensitive, time sensitive, and time insensitive tasks.

This method requires establishment of a background executive that processes time insensitive tasks. From time to time, a midground executive becomes active and processes time sensitive tasks. More particularly, time sensitive tasks are organized into groups, and at least one group of particularly critical time sensitive tasks are identified for processing with each activation of the midground executive. Other identified groups are not processed as frequently, and, for instance, may only be processed every other time the midground executive becomes active. The process can be carried further, such that some groups of less critical (but yet time sensitive) tasks are processed by the midground executive every fourth pass, and the like.

Importantly, the tasks and groups are organized such that with any activation of the midground executive all tasks identified for processing at that time can be completed in less than a preselected period of time.

Finally, a foreground executive is established to allow processing of real-time sensitive tasks in an interrupt driven manner.

Pursuant to this method, the background executive will automatically be interrupted from time to time to allow processing of midground executive tasks, which tasks are selected to ensure completion within a predetermined period of time. At all times, real-time sensitive tasks can be accommodated via a foreground executive.

In one embodiment of the invention, the foreground executive includes a method to allow establishment of prioritization as between multiple interrupts. Pursuant to this method, when an interrupt becomes active, the foreground executive automatically inhibits or enables the remaining interrupts, such that the immediate interrupt will either complete or itself be interrupted depending upon this pre-established prioritization.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein:

FIG. 3 comprises a flow chart diagram of the operating system.

BEST MODE FOR CARRYING OUT THE INVENTION

Figure 1:
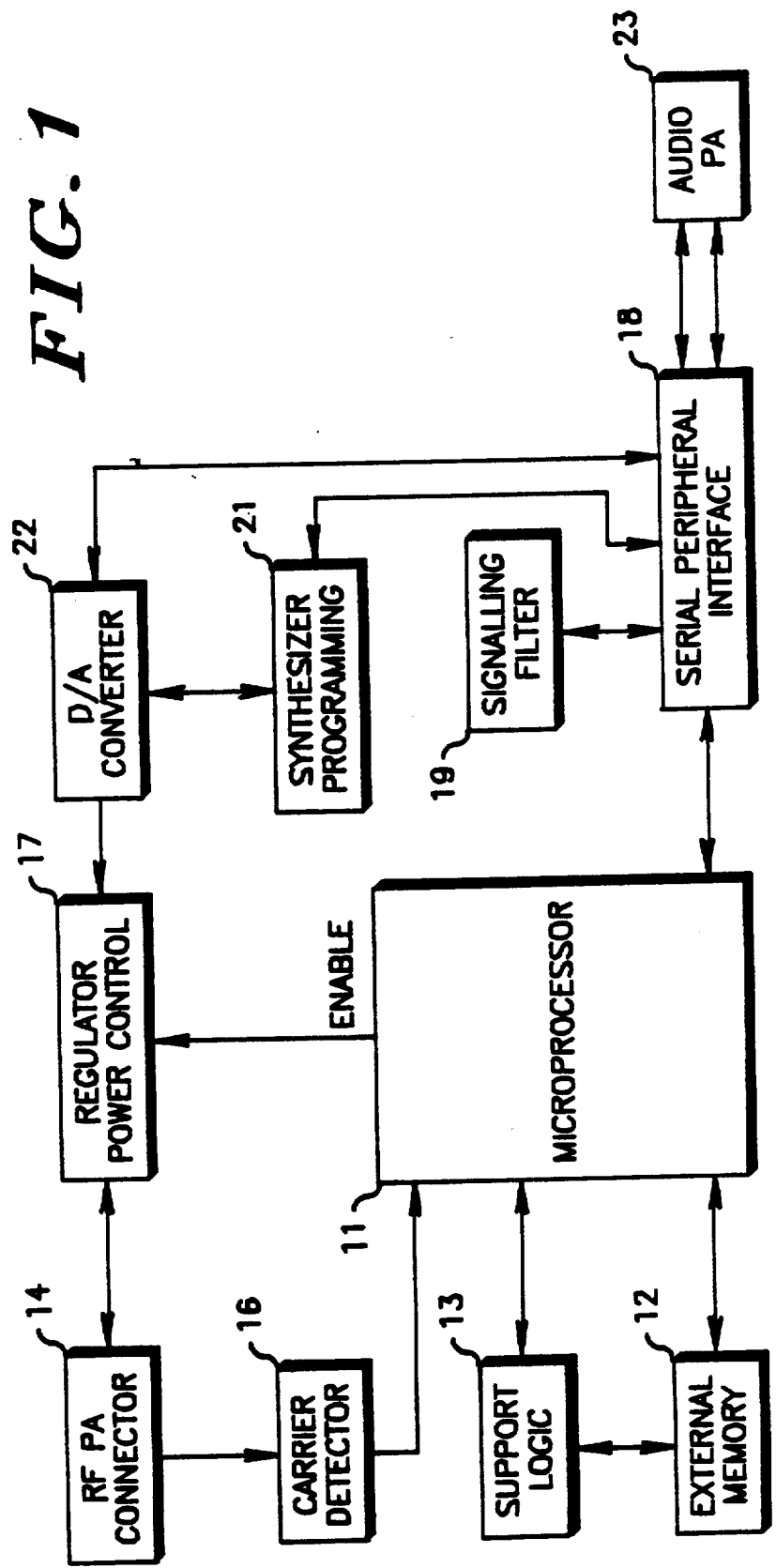
FIG. 1 comprises a block diagram view of a microprocessor/controlled two-way radio.

Referring now to FIG. 1, a microcomputer (11) (such as an MC68HC11 as manufactured by Motorola, Inc.) can be seen as connected to various components within a two-way radio. These components include external memory (12), and other support logic (13) as understood in the art. In addition, from an RF power amplifier connector (14), a carrier detector (16) provides an indication to the microcomputer (11) as to the presence or absence of a carrier signal on a monitored channel. In addition, a regulator power control (17) can be controlled via the microcomputer (11) and through a serial peripheral interface (18), the microcomputer (11) can receive information from and influence a signalling filter (19), a synthesizer programmer (21), a digital to analog convertor (22), and an audio power amplifier (23).

So configured, the microcomputer (11) receives information regarding the functioning of the radio and influences to a great extent the mode of operation of the radio. For example, in a trunked communication application, the microcomputer (11) provides the necessary software resources to allow interaction with the trunked control center's channel assignment and channel maintenance information, along with other signalling. In a conventional radio operation, the microcomputer (11) will support channel scanning activities, priority channel scan activities and other signalling responsibilities as may be appropriate.

Some of these tasks are real-time sensitive. Others are only time sensitive, and yet others are substantially time insensitive. Until the advent of this invention, no two-way communications radio has been introduced having only a single microcomputer capable of accommodating both trunked communications activities and fully capable conventional operation, such as conventional plus channel scanning operation. Instead, either minimal performance would be provided, or multiple microcomputers would be utilized.

Figure 2:
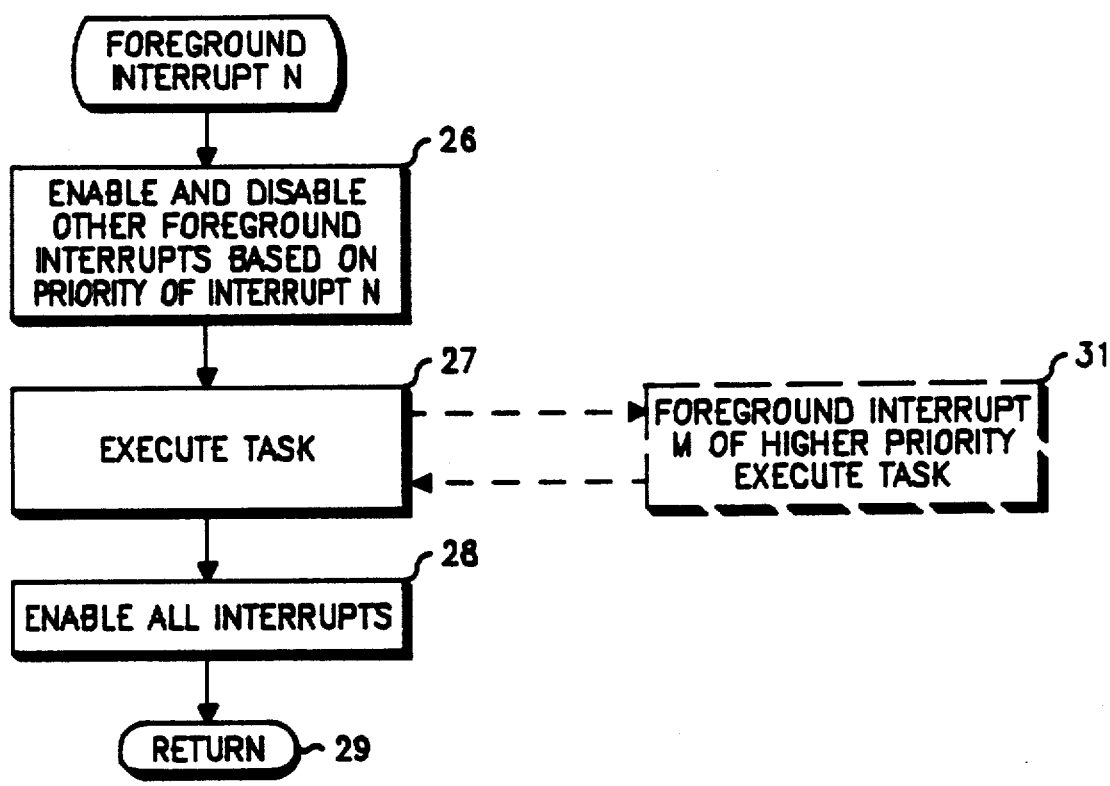
FIG. 2 comprises a flow chart depicting the foreground executive.

Referring now to FIG. 2, the microcomputer (11) can include a plurality of interrupts. When one of these interrupts becomes active, the microcomputer (11) initializes a foreground executive (24). Presuming that interrupt N has been activated, the foreground executive will then enable and/or disable other foreground interrupts based on the relative priority of interrupt N (26). In particular, interrupts having a higher priority than interrupt N will continue to be enabled, whereas interrupts that have a lower priority than interrupt N will be disabled such that the interrupt N task can be completed without interference from such lower priority activities.

Following establishment of priority, the appropriate task will then be executed (27), following which all interrupts will again be enabled (28) and the foreground executive will return (29) to the process that was previously interrupted.

If, during execution of the task (27), another foreground interrupt M occurs, which interrupt M has a higher priority than interrupt N, the N task will be interrupted and the foreground executive will allow execution of the M task as depicted in phantom lines by the numeral 31.

Referring now to FIG. 3, the basic configuration of the operating system can be seen as depicted by the numeral 40. From time to time, the microcomputer (11) will leave the background executive tasks and initiate instead a midground executive (41). In the embodiment depicted, a timer interrupt can be provided to cause this midground executive initiation to occur 2.5 milliseconds following activation of the background executive (42). Other times could of course be selected to suit a particular application.

The midground executive (41) initially clears the interrupts (43) and then enables all foreground interrupts (44) to allow all foreground interrupts to have higher priority than the midground executive tasks.

The midground executive (41) then executes a plurality of tasks (46). With every pass of the midground executive, a first group (group 1) (48) of tasks will be processed, presuming that any of such tasks require processing at that time Tasks that are assigned to this group 1 are those tasks which are particularly important and perhaps have a somewhat higher time sensitivity than other midground executive tasks.

Following completion of all group 1 tasks, the midground executive (41) next executes either the tasks collected together as group 2 (49), or the tasks collected together as group 3 (51). In the embodiment depicted, the routine will process group 2 tasks with every other pass, and will process group 3 tasks in the alternate passes. The tasks assigned to these two groups constitute tasks that are somewhat less time sensitive than those tasks assigned to group 1, and consequently can accommodate a potentially longer time until being processed.

Following execution of either the group 2 or group 3 tasks, additional groups can be processed as depicted, which latter groups (52, 53, 54 and 56) are yet another degree less sensitive to time restraints Tasks assigned to the latter groups are therefore those tasks which, while perhaps time sensitive, have less sensitivity than the tasks identified earlier.

It would of course be possible, in an appropriate application, to extend yet additional levels of group execution. It is important, however, that the groups be oriented such that the total execution time for all groups for any one pass through the midground executive be within a predetermined time limit. For example, in the embodiment depicted, the Applicant has determined that all midground executive tasks that can potentially occur with any one pass through the subroutine will be completed within 2.5 milliseconds including time that may be lost to processing all likely foreground interrupts.

If a foreground interrupt should occur (24), then the foreground executive will of course become active as described above and the foreground task will be performed. The foreground executive will then return control to the midground executive, which will continue the original processing from where it had left off.

When the midground executive has completed the above noted tasks (46), the midground executive will return control to the background executive (47).

By provision of this operating system in a single microprocessor in a two-way radio, extremely important benefits result. In particular, the radio can now accommodate a wide plurality of processing tasks, and can therefore accommodate various signalling systems, and modes of operation. Consequently, for the first time, a two-way radio can be provided that, while having only a single microprocessor, can accommodate both trunked and higher tiered conventional operation, wherein the conventional operation includes, for example, channel scanning capability. This results in obvious significant cost savings to the manufacturer and additional useful features to the radio user.

Those skilled in the art will appreciate that various modifications could be made to the invention without departing from the spirit of the invention itself It should therefore be understood that the claims are not to be considered as being limited to the precise embodiments set forth, in the absence of express recitations directed to such limitations.

I claim:

1. In a radio transceiver having a microcomputer that interfaces with and controls various components and functions in said radio transceiver, a method of executing such radio control tasks through use of said microcomputer, the method comprising the steps of:
   providing said microcomputer with:
      at least one timer interrupt; and
      at least one other interrupt means for allowing current processing in said microcomputer to be reprioritized in favor of a predetermined task;
   providing a background executive for processing tasks in said microcomputer that are substantially non-interrupt driven;
   providing a midground executive that functions to control processing in said microcomputer whenever said timer interrupt becomes active, said midground executive including the following steps:

always processing a first group of preselected tasks, if any of said preselected tasks need to be performed at that time;

occasionally, but not always, processing at least a second group of preselected tasks, if any of said preselected tasks need to be performed at that time; such that said first group and said second group of preselected tasks can be processed by said microcomputer in less than a preselected period of time;

providing a foreground executive for processing preselected foreground tasks in said microcomputer as are previously associated with said interrupt means.

2. The method of claim 1 wherein said midground executive functions no longer than a predetermined period of time.

3. The method of claim 2 wherein said predetermined period of time is 2.5 milliseconds.

4. The method of claim 2 wherein said predetermined period of time may be extended to accommodate foreground executive tasks.

5. The method of claim 1 and further including a plurality of said other interrupt means, wherein said foreground executive establishes a priority for each of said interrupt means by selectively inhibiting and enabling said interrupt means when one of said interrupt means is activated.

6. The method of claim 1 wherein said second group of preselected tasks are processed every other time said midground executive concludes processing said first group of preselected tasks.

7. The method of claim 6 wherein said midground executive processes at least a third group of predetermined tasks, if any of said predetermined tasks need to be performed at that time, at those times when said midground executive is not processing said second group of preselected tasks.

8. In a radio transceiver having a microcomputer that interfaces with and controls various components and functions in said radio transceiver, a method of executing such radio control tasks through use of said microcomputer, the method comprising the steps of:

providing said microcomputer with:
at least one timer interrupt; and
at least one other interrupt means for allowing current processing in said microcomputer to be reprioritized in favor of a predetermined task;

providing a background executive for processing tasks in said microcomputer that are substantially non-interrupt driven;

providing a midground executive that functions to control processing in said microcomputer whenever said timer interrupt becomes active, said midground executive including the following steps:

always processing a first group of preselected tasks, if any of said preselected tasks need to be performed at that time;

processing at least a preselected one of a plurality of groups of preselected tasks, if any of said preselected tasks of said preselected group need to be performed at that time; such that said first group and said preselected group of preselected tasks can be processed by said microcomputer in less than a preselected period of time;

providing a foreground executive for processing preselected foreground tasks in said microcomputer as are previously associated with said interrupt means.

9. The method of claim 8 wherein said midground executive processes a plurality, but not all, of said plurality of groups of preselected tasks, such that said first group and said plurality of preselected groups of preselected tasks can be processed by said microcomputer in less than a preselected period of time.

10. The method of claim 8 wherein at least some of said plurality of groups of preselected tasks are processed more frequently than others of said plurality of groups.

11. The method of claim 8 wherein two of said plurality of groups of predetermined tasks are processed more frequently than others of said plurality of groups.

12. In a computer having a plurality of interrupt means for allowing current processing in said computer to be reprioritized in favor of a predetermined task, a method of managing processing of real-time sensitive, time sensitive, and time insensitive tasks comprising:

(A) initiating a background executive routine insensitive tasks;

(B) activating from time to time a midground executive routine to process time sensitive tasks, comprising the following steps:

processing a first group of preselected tasks to the extent that any of such first group of preselected tasks require processing at that time;

processing a second group of preselected tasks to the extent that any of such second group of preselected tasks require processing at that time, wherein said second group of preselected tasks is selected from a plurality of groups of preselected tasks;

such that said first group and said second group of preselected tasks can be processed in less than a preselected period of time;

(C) whenever any of said interrupt means are activated, initiating a foreground executive routine to allow processing of real-time sensitive tasks.

* * * * *

UNITED STATES PATENT AND TRADEMARK OFFICE
CERTIFICATE OF CORRECTION

PATENT NO. : 5,001,666

DATED : March 19, 1991

INVENTOR(S) : Thompson, et al

It is certified that error appears in the above-identified patent and that said Letters Patent is hereby corrected as shown below:

Column 6, Line 35, after "routine", please insert -- to process time--.

Signed and Sealed this

Twentieth Day of October, 1992

*Attest:*

DOUGLAS B. COMER

*Attesting Officer*     *Acting Commissioner of Patents and Trademarks*